March 20, 1928.
W. H. FISCHER
ANTISKID DEVICE
Filed Dec. 29, 1926
1,662,886
2 Sheets-Sheet 1
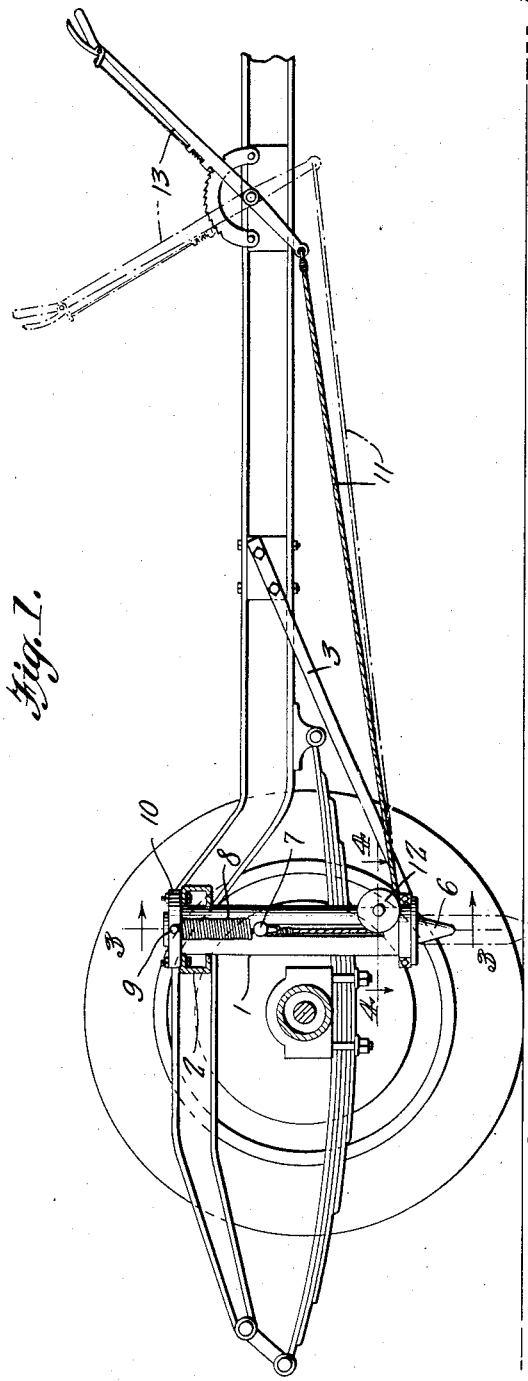
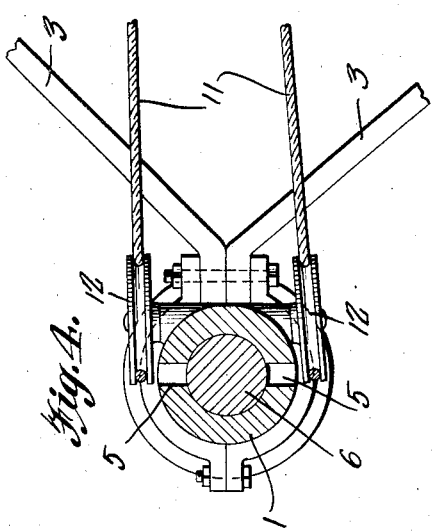
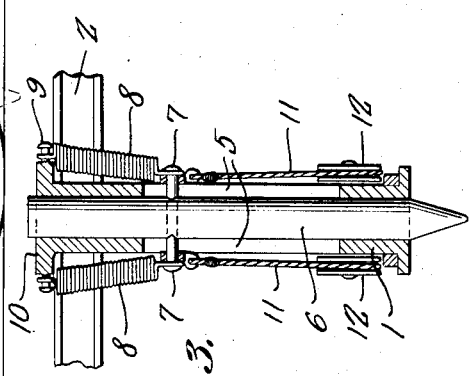
William H. Fischer,
INVENTOR
BY *Victor J. Evans*
ATTORNEY
WITNESS: *P. T. Hickey*

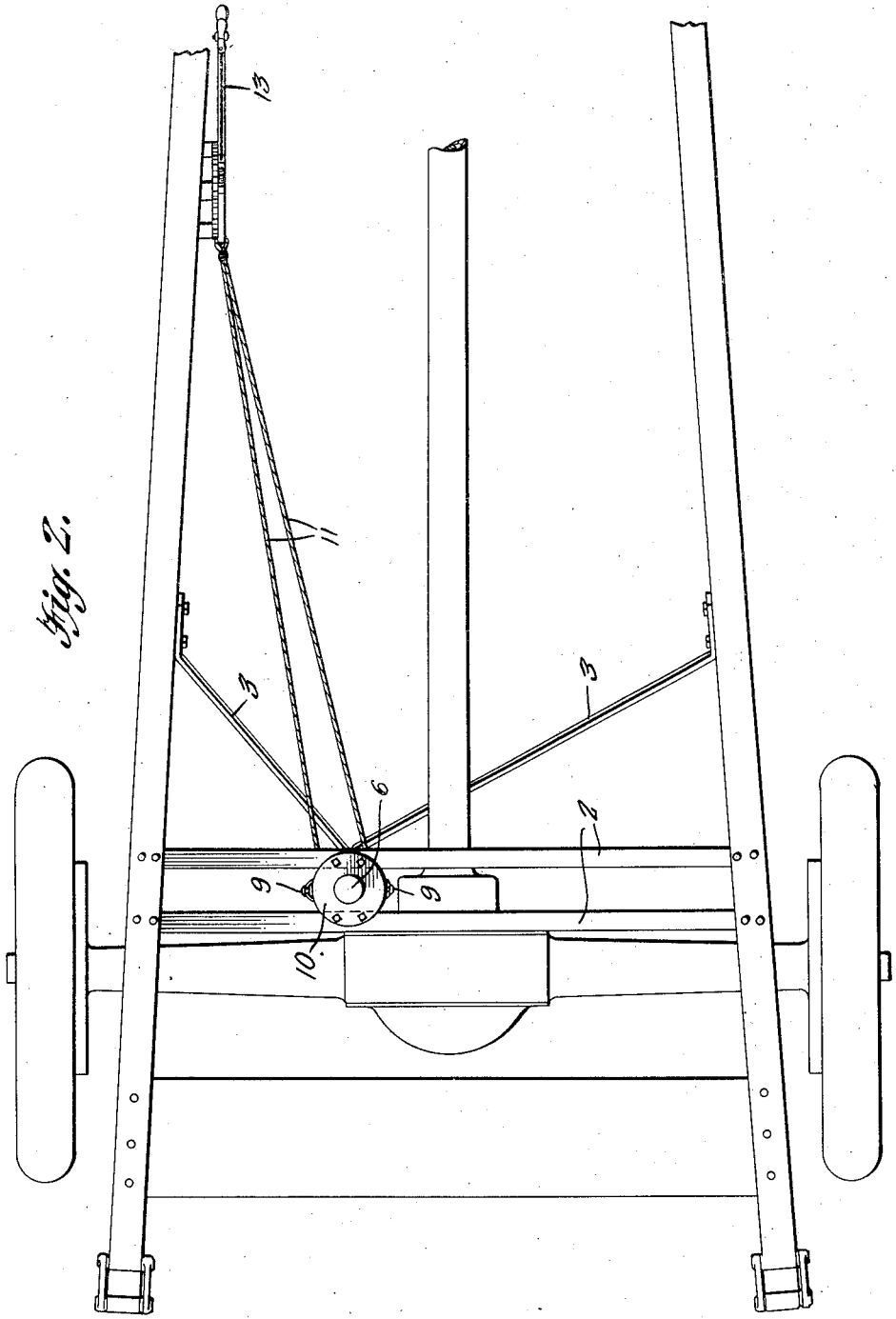

Patented Mar. 20, 1928.

1,662,886

UNITED STATES PATENT OFFICE.

WILLIAM HERMAN FISCHER, OF SHARPSBURG, PENNSYLVANIA.

ANTISKID DEVICE.

Application filed December 29, 1926. Serial No. 157,781.

This invention relates to an anti-skid device for motor vehicles, the general object of the invention being to provide a pointed member supported for vertical movement from the chassis of the vehicle and normally held in raised position by springs, with manually operated means for lowering the member to bring its pointed end in engagement with the road surface to check the skidding of the vehicle over slippery roads.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through the chassis of a vehicle, showing the invention applied thereto.

Figure 2 is a plan view of Figure 1.

Figure 3 is a section on line 3—3 of Figure 1.

Figure 4 is a section on line 4—4 of Figure 1.

In these views 1 indicates a cylinder which is supported in vertical position from the chassis of a vehicle by means of the two cross bars 2 and the braces 3 which are fastened to the side members of the chassis. The cylinder is provided with a pair of longitudinally extending slots 5 and a pointed member 6 is slidably arranged in the cylinder with its pointed end lowermost. A pin 7 passes through a hole in the member 6 and has its ends projecting from the slots 5. A pair of coil springs 8 each has its upper end connected to a pin 9 projecting from a collar 10 on the upper end of the cylinder, with its lower end connected to the pin 7 so that these springs tend to hold the member 6 in raised position. A cable 11 is connected to each end of the pin 7 and these cables pass downwardly over the pulleys 12 at the lower end of the cylinder and then the cables pass forwardly and are connected to the lower end of a hand lever 13 which is arranged at the left hand side of the vehicle at a point where it can be manipulated by the driver of the vehicle.

From the foregoing it will be seen that the pointed member is normally held by the springs in raised position with its lower pointed end well above the road surface. If the vehicle should start to skid or slip, the driver would pull the lever 13 from the full line position to the dotted line position of Figure 1, which would cause the cables to pull the member 6 downwardly against the action of its springs 8 and thus engage its pointed end with the road surface, as shown in dotted lines in Figure 1. This would effectively stop the skidding of the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An anti-skid device for a motor vehicle comprising a frame attached to the chassis of the vehicle, a vertically arranged cylinder carried by the frame and having oppositely arranged slots therein, a pointed member slidably arranged in the cylinder, a pin passing through the member and through the slots, a pair of springs connected with the top of the cylinder and with the ends of the pin for holding the member in raised position, a pair of pulleys at the lower end of the cylinder, cables connected with the end of the pin and passing around the pulleys and a hand lever connected with the other ends of the cables.

In testimony whereof I affix my signature.

WILLIAM HERMAN FISCHER.